Dec. 22, 1931.   G. FLINTERMANN   1,837,360
FLEXIBLE JOINT
Filed July 13, 1928
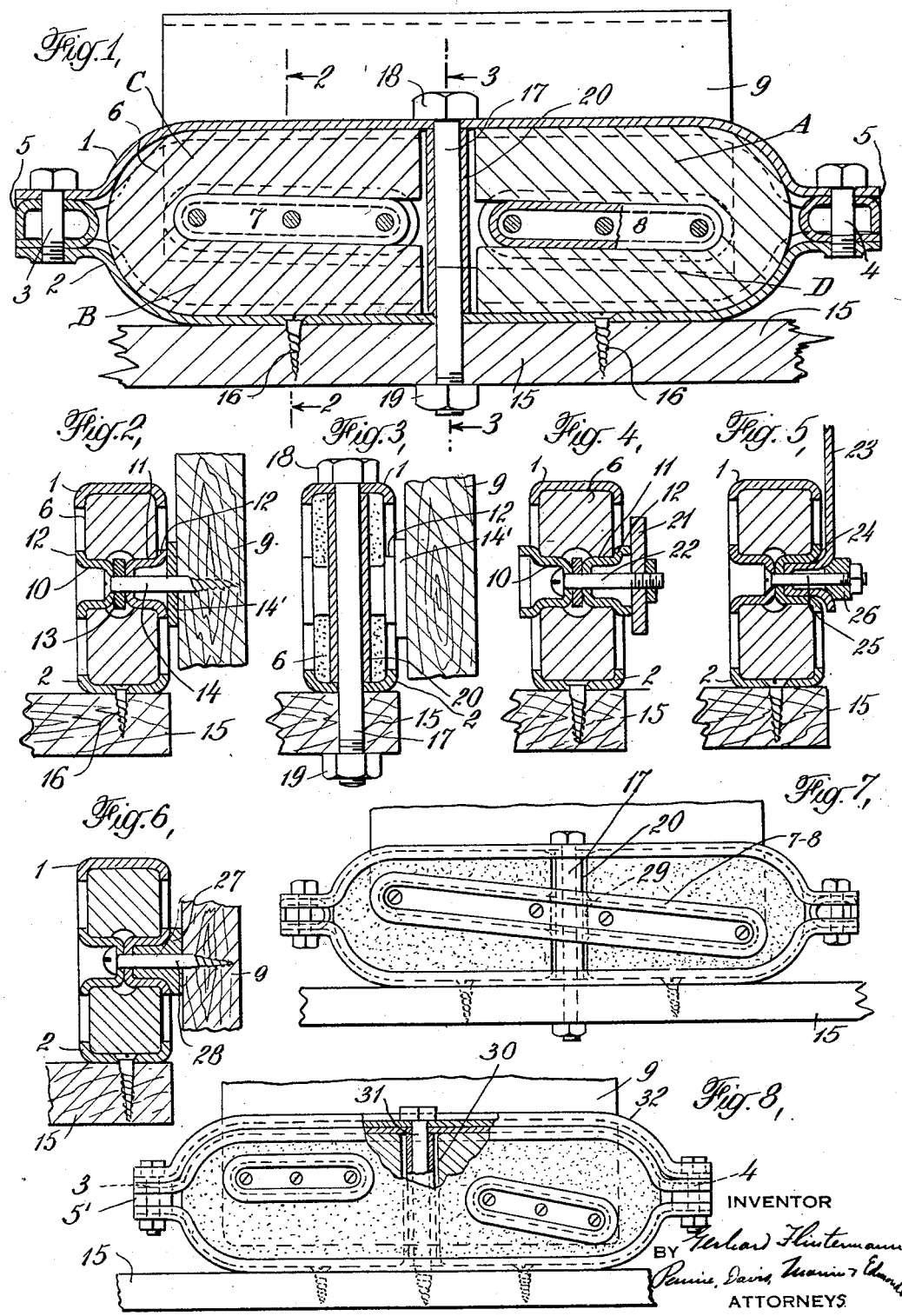
INVENTOR
BY
ATTORNEYS Patented Dec. 22, 1931

1,837,360

UNITED STATES PATENT OFFICE

GERHARD FLINTERMANN, OF EAST ORANGE, NEW JERSEY

FLEXIBLE JOINT

Application filed July 13, 1928. Serial No. 292,363.

This invention relates to flexible joints of the type in which there is an outer casing, an inner member and a body of non-metallic resilient material such as rubber located between the inner member and the walls of the casing. When such joint is connected to the objects between which the joint is to be interposed as by connecting the inner member to one of the objects and the outer casing to the other object, there is usually an outward pressure exerted somewhere on the walls of the outer casing due perhaps to the load or due perhaps to the compression of certain parts of the resilient material which takes place during the operation of the joint when the axes of the inner member and the outer casing change their angular relation. This is particularly noticeable in a flexible joint of the type disclosed in my copending application, Serial No. 187,156, filed April 28, 1927. If the outer casing is formed of heavy material this pressure may no doubt be withstood by the inherent strength of the walls of the casing, but I prefer to make the walls of the casing of pressed metal for the sake of simplicity of construction and low cost of manufacture. However, pressed metal may not have the requisite strength to withstand the outward pressure on the walls of the casing above mentioned. One object of this invention is to supplement the walls of a flexible joint of the type above described, when not inherently strong enough to satisfactorily withstand the outward pressure, with additional reinforcing or restraining means which opposes such outward pressure. The use of such restraining or reinforcing means permits the use of a casing material which can be easily and cheaply formed into an inexpensive casing of the requisite shape.

Another object of the invention resides in the provision of certain additional features of construction which, although designed especially to accompany the reinforcing or restraining means, are capable of independent use in a joint of the type herein disclosed.

In the accompanying drawings:

Fig. 1 is a longitudinal section through a flexible joint constructed in accordance with the invention;

Fig. 2 is a transverse vertical section taken on the line 2—2 of Fig. 1;

Fig. 3 is a transverse vertical section taken on the line 3—3 of Fig. 1;

Figs. 4, 5 and 6 are vertical transverse sections illustrating certain modifications which may be made in the inner structure of the joint; and Figs. 7 and 8 are side elevations of modified forms of joints constructed in accordance with the invention.

The particular flexible joint illustrated in the drawings comprises an elongated outer casing made of separately formed channel shaped strips or sections 1 and 2. These sections are secured together at their extremities by bolts or machine screws 3 and 4. Spacers 5 may be inserted between the extremities of the two sections of the casing for the purpose hereinafter described. These spacers may be of any suitable construction, but I prefer to make them out of a piece of sheet metal bent to the approximate shape shown in the drawings.

The casing houses and confines a mass of non-metallic resilient material 6 which has the general form of an elongated annulus. The outer edge portion of the resilient material is engaged by the channels in the casing strips 1 and 2. The spacers 5 are so chosen as to size that when the bolts 3 and 4 are tightened the interior of the casing will be the proper size with respect to the mass of resilient material.

The inner edge portion of the annulus of resilient material 6 is engaged by the inner structure of the joint. In the case of Fig. 1 this inner structure comprises two elongated members 7 and 8 both of which are secured to a bracket or the like 9 which in turn may be fastened to one of the objects between which the joint is to be interposed. The part 9 may, in fact, be a portion of the object itself. The inner members 7 and 8 may be constructed in any suitable way. In Figs. 1 and 2 each of the members is represented as a composite one made up of two elongated cups 10 and 11 positioned with their bottom webs toward each other and rigidly held in this position. Each cup has a flange 12 at its edge so that when the cups 10 and 11 of one member are clamped together the flanges jointly form an annular groove or channel which receives and grips the inner edge portion of the resilient material. In Fig. 2 there is shown a spacer or washer 13 between the adjacent bottom webs of the two cups of each member. This washer may be so chosen as to thickness that the shoulders 12 on the cups are spaced apart the proper distance with respect to the thickness of the resilient material. In Fig. 2 the fastening means for the cups 10 and 11 of each member is represented as being one or more wood screws. These wood screws have the additional function of securing the corresponding entire composite member to the bracket 9. In Fig. 2 the bracket 9 is represented as being made of wood and the screw 14 is simply screwed into it until the edges of the inner cups 11 are clamped against a metallic washer or plate 14' interposed between them and the bracket 9. The washer or plate 14' provides a hard surface for the cup-like members 11 to be clamped against, and it also acts as a spacer to prevent contact between the part 9 and those parts of the joint which move relative to it.

The outer casing may be secured to the other of the two objects between which the joint is interposed either directly or through a suitable bracket or the like. The part 15 represents such other object, or a portion thereof, or a part secured to it, and the casing of the joint may be secured to such part 15 by means of wood screws 16. Of course, any other type of fastening means may be employed.

The main purpose of dividing the inner structure into two members is to provide a space between their adjacent inner ends through which the reinforcing or restraining means for the outer casing may pass. In Fig. 1 this restraining means is represented as being a bolt 17 having a head 18. The opposite end of the bolt may pass through the member 15 and may be provided with a nut 19. The bolt 17 passes through a sleeve 20 which extends from the inner surface of the casing section 1 to the inner surface of the casing section 2. When the nut 19 is tightened the sleeve 20 is gripped between the walls of the casing and acts as a spacer and at the same time the head 18 of the bolt is retracted against the top surface of the casing. It is evident that the bolt 17 will have the effect of opposing any outward pressure which takes place either on the walls of section 1 of the casing or on the walls of section 2 of the casing, or on both. The bolt 17 also assists in attaching the casing to the part 15, and in fact may be the sole fastening means for this purpose if the screws 16 are omitted.

The annulus of resilient material need not be continuous, i. e. in one piece, but may be divided into two bodies as shown in Fig. 6, one located in one end of the casing to one side of the bolt 17 and the other located in the other end of the casing to the other side of the bolt 17.

In use the joint is interposed between the two objects by connecting the two members of the inner structure to one of the objects and the outer casing to the other object. For instance, the part 9 may be a portion of a seat or a part connected to a seat and the part 15 may be a part of the support for that seat, or a part connected to such support, or vice versa. When so connected the seat would have a vertical play or movement which is yieldingly resisted by the resilient material and the seat would be capable of a tilting motion with respect to the support, and such tilting motion would be yieldingly resisted by the elongated mass of resilient material. The action of the joint is approximately the same as the action of the joint disclosed in the aforesaid copending application, inasmuch as the inner cup-like members 7 and 8, being secured to the same member 9, constitute in effect a single member, and moreover, the sub-division of the resilient material into two separate bodies does not cause its action to be materially different from what it would be if the resilient material were all in one piece. When there is an angular change between the objects connected with the joint as, for instance, when the seat tilts with respect to its support there will be a change in the angular relation between the axis of the inner structure of the joint and the axis of the outer casing. This will cause a compression of the resilient material in the vicinity of the points marked A and B, or in the vicinity of the points marked C and D depending upon the direction of the tilt.

When the axis of the inner structure of the joint changes its angular relation to the axis of the outer casing due, for instance, to the tilting movement of the seat, the compression of the resilient material at certain points in the casing will cause an outward pressure against the walls of the casing. Moreover, the static load in some cases may cause an outward pressure against at least one wall of the casing. For instance, if the part 9 were connected to a support and the part 15 were connected to a seat or other load the resilient material would be compressed along the upper rim of the elongated annulus and this would exert an upward pressure against the top section 1 of the casing. It is the function of the bolt 17, or equivalent restraining means, to oppose the outward pressure against the walls of the casing caused by these or similar conditions.

The resilient material may be thicker at the points marked A and B than at the points marked C and D. The purpose of this is fully discussed in the copending application above referred to, and as it has no significance in this application it is not thought necessary to repeat the discussion here. So far as this invention is concerned the resilient material may be made in many different ways. For instance, if the resilient material be rubber its density may be greater at one side of the bolt 17 than at the other side.

The washer or plate 14' of Fig. 2 may be omitted if desired as shown in Fig. 4. This may be desirable when the part to which the inner structure is secured is made of metal as represented at 21 (Fig. 4). In this case the edges of the inner cups 11 may be extended axially beyond the flanges 12 so that they will contact with the part 21, and also serve the spacing function of the washer 14' of Fig. 2. The edge portion of the outer cups 10 may, or may not, be extended axially in a similar manner. In Fig. 4 they are shown as extending axially, because from a manufacturing standpoint, it is desirable that they be duplicates of the inner cups. In view of the fact that the part 21 is made of metal the wood screw 14 of Fig. 2 may be replaced by a bolt 22.

Fig. 5 shows another way in which the two members of the inner structure may be secured to a metal member. In this case the metal member 23 has projections 24 which fit into the cavities in the two inner cups. The fastening may be accomplished by means of bolts 25 and washers 26. The projections 24 are long enough to space the part 23 from the parts of the joint which move relative to it.

In Fig. 6 the washers 14' of Fig. 2 are replaced by blocks 27 inserted in the cavities of the two inner cups. They extend axially a sufficient distance to space the part 9 from the parts of the joint which move relative to it. In this figure the member to which the inner structure is secured is represented as being made of wood and corresponds with the member 9 of Fig. 2. A wood screw 28 is therefore employed to attach the members of the inner structure to the member 9. The blocks 27 may be made of any suitable material such as metal or wood.

In all of the figures so far described the bolts, screws or similar devices for attaching the members of the inner structure to one of the objects between which the joint is to be interposed also serve to bind together the inner and outer cups to cause a gripping of the inner edge portion of the resilient material, but it is obvious that separate securing means may be used to accomplish these two purposes.

In Fig. 7 the inner structure of the joint comprises one continuous member 7—8, that is, it is not divided into two separate members such as shown at 7 and 8 in Fig. 1. In order to accommodate the reinforcing or restraining bolt 17 and its surrounding spacing sleeve 20 the inner member 7—8 may be provided with a hole or opening 29 large enough to receive the bolt and the sleeve and large enough to permit the tilting movement of one member of the joint relative to the other.

In Fig. 8 the inner structure is divided into two members as in Fig. 1, and the two members are unsymmetrically positioned in the casing. By arranging one of the inner members in its half of the casing in a manner dissimilar to the arrangement of the other member in its half of the casing, the action of the two inner members will be unlike. For instance, when they are both connected to the same member such as that shown at 9, they may be so positioned in the resilient material that the action at one end of the seat, platform or the like connected with the member 9 will be different from that which takes place at the other end. This may be desirable in some cases where more yielding is desired at one part of the seat or platform than at another part, or where a different kind of yielding action at these places is desired. The two inner members, instead of being connected to a unitary object may be connected to two separate relatively movable objects. This applies also to the two separate members shown in Fig. 1, but applies particularly to Fig. 8 in cases where the movement of one of the two relatively movable objects should be of a different character from the other. Fig. 8 shows the resilient material formed in one piece in which case it would be provided with an opening 30 large enough to receive the restraining member and the spacing sleeve. In any of the forms of joint described above the resilient material may likewise be made in one piece and provided with a hole to receive the reinforcing or restraining bolt.

Where the restraining member passes through or into a wooden member such as that shown at 15 the end of the restraining member may be formed like a wood screw as shown at 31 in Fig. 8 in which case the restraining member will be screwed into the member 15 until the two parts of the outer casing are clamped tightly enough together at their mid-portion to oppose the outward pressure on the walls of the casing.

The spacing blocks 5 shown in Figs. 1 and 7 may, if desired, be replaced by solid spacing blocks such as shown at 5' in Fig. 8.

One or both members of the outer casing may be additionally reinforced if desired by superposing over it another member corresponding with it in its general shape. Such a superposed member is shown at 32 in Fig. 8. It may be channel shaped in cross-section to give it greater strength and the open side of the channel may be directed outwardly. The additional reinforcing member may be held in place by the bolts 3 and 4.

The restraining or reinforcing means constituting the main feature of this application may be used in any flexible joint where there is an outward pressure exerted on the walls of the casing due to static load or incidental to the operation of the joint, and where the casing itself does not have sufficient inherent strength to oppose this pressure. The reinforcing or restraining means is particularly advantageous for use in a joint where it is desired to form the casing in a simple manner of a material which does not, in itself, possess a high degree of strength, such for instance, as pressed metal. The outward pressure on the walls of the casing takes place to a pronounced degree in a flexible joint of the type herein disclosed and for that reason the reinforcing or restraining means has been illustrated and described in connection with that type of joint.

When the reinforcing or restraining means is in the form of some member such as the bolt 17 passing through the middle of the casing provision must be made for accommodating it and this is preferably accomplished by dividing the resilient material into two bodies and by dividing the inner structure of the joint into two elongated members although it may be accomplished in other ways as hereinbefore described. The feature of dividing the inner structure of the joint into two members may be advantageously used in flexible joints even when the reinforcing or restraining means is omitted. It may be desirable to use this feature independently of the reinforcing means because of the effect it may have on the cost of manufacture or ease of assembly or its effect on the operation of the joint.

I claim:

1. A flexible joint comprising inner and outer members adapted to be connected to the objects between which the joint is to be interposed and non-metallic resilient material located between said members, the outer member comprising two separately formed sections, means for securing the end portions of said sections together and restraining means located between said fastening means for opposing outward pressure on the wall of at least one of said sections incidental to the operation of the flexible joint.

2. A flexible joint comprising an elongated outer casing, an elongated inner structure located in the casing, non-metallic resilient material between said inner structure and the walls of said casing, said casing and the inner structure adapted to be connected to the objects between which the joint is to be interposed, and a restraining member passing through the intermediate portion of the casing and acting on at least one of the walls of said casing for opposing outward pressure on that wall of the casing incidental to operation of the flexible joint, the resilient material in the casing being divided into at least two separate bodies, one located on each side of said restraining member.

3. A flexible joint comprising an elongated outer casing, an inner structure located in the casing, non-metallic resilient material between said inner structure and the walls of said casing, said casing and the inner structure adapted to be connected to the objects between which the joint is to be interposed, and a restraining member passing through the casing and acting on at least one of the walls of the casing for opposing outward pressure on that wall of the casing incidental to operation of the joint, said inner structure comprising two elongated members one located on each side of said restraining member.

4. A flexible joint in accordance with claim 3 in which the resilient material is divided into at least two bodies, one located on each side of said restraining member.

5. The combination with a flexible joint of the type in which there is an outer casing composed of two separately formed sections, fastening means located substantially at the ends of the casing for securing said sections together, an inner structure located in the casing, non-metallic resilient material between said inner structure and the walls of said casing, and in which the parts tend to create an outward pressure on at least one of the walls of the casing during the operation of the joint when the casing and inner structure are respectively connected to the objects between which the joint is to be interposed, of reinforcing means acting on the casing substantially at its center for opposing said outward pressure on the walls of the casing.

6. The combination with a flexible joint of the type in which there is an elongated outer casing composed of separately formed sections, means for spacing the ends of said sections apart, fastening means located at substantially the ends of the casing for clamping said sections together against said spacing means, an elongated inner structure located in the casing, non-metallic resilient material between said inner structure and the walls of said casing and in which the parts tend to create an outward pressure on at least one of the walls of the casing during the operation of the joint when the casing and inner structure are respectively connected to the objects between which the joint is to be interposed, of reinforcing means acting on an intermediate portion of at least one of the walls of the casing for opposing outward pressure on that wall incidental to operation of the flexible joint.

7. A flexible joint comprising an elongated outer casing, an inner structure located in the casing and non-metallic resilient material between said inner structure and the walls of said casing, said casing and the inner structure adapted to be connected to the objects between which the joint is to be interposed, and said inner structure comprising two separately formed elongated members positioned in opposite end portions of the casing.

8. A flexible joint comprising an outer casing, an inner structure located in the casing, non-metallic resilient material between said inner structure and the walls of said casing, said casing and the inner structure being adapted to be connected to the objects between which the joint is to be interposed, a member passing through the casing and having at one end a shoulder adapted to be retracted against the outer surface of the casing wall and means at the other end of said member for so retracting said shoulder against the casing wall, said resilient material being divided into at least two bodies one located on each side of said member passing through the casing.

9. A flexible joint comprising an outer casing, an inner structure located in the casing and non-metallic resilient material between said inner structure and the walls of said casing, said casing and the inner structure adapted to be connected to the objects between which the joint is to be interposed, and reinforcing means acting on at least one of the walls of the casing for opposing outward pressure on that wall of the casing incidental to the operation of the flexible joint, said inner structure comprising two separately formed members positioned respectively on opposite sides of said reinforcing means.

In testimony whereof I affix my signature.

GERHARD FLINTERMANN.